United States Patent [19]
Kasuga et al.

[11] 3,873,691
[45] Mar. 25, 1975

[54] KILLED VACCINE FOR INFECTIOUS PORCINE ATROPHIC RHINITIS AND PROCESS FOR PREPARING THE SAME

[75] Inventors: Tadayoshi Kasuga, Tokyo; Yasukiyo Nakase, Yokohama; Minoru Kawahira, Chiba, all of Japan

[73] Assignee: The Kitasato Institute, Tokyo, Japan

[22] Filed: Mar. 31, 1972

[21] Appl. No.: 240,134

[30] Foreign Application Priority Data
May 12, 1971 Japan.............................. 46-31213

[52] U.S. Cl.................................... 424/92, 195/102
[51] Int. Cl............................................ A61k 23/00
[58] Field of Search........................................ 424/92

[56] References Cited
OTHER PUBLICATIONS

Nakase, Y., Kitasato Arch. Exp. Med., 30: 15 (1957), "Studies on Hemophilus Bronchisepticus I. The Antigenic Structures of H. Bronchisepticus from Guinea Pig."

Ganaway et al., Lab. Anim. Care, 15: 156–162 (1965), "Prevention of Acute Bordetella Bronchiseptica Pneumonia in a Guinea Pig Colony."

Harris et al., Am. J. Vet. Res. 30: 116–1166 (1969), "Nasal and Tracheal Resistance of Swine Against Reinfection by Bordetella Bronchiseptica."

*Primary Examiner*—Shep K. Rose
*Attorney, Agent, or Firm*—Armstrong, Nikaido & Wegner

[57] ABSTRACT

A killed vaccine for infectious porcine atrophic rhinitis which is prepared from a Phase I organism contained in the microorganism *Bordetella bronchiseptica*, and a process for preparing said vaccine. The Phase I organism of said microorganism is a Gram-negative germ, which possesses a K antigen and an antigen capable of giving to mice a protective potency against mouse intracerebral infection and exhibits on a blood agar medium a coccoid or coccobacillary form having capsules or envelopes and having no or slight flangella, and which has such properties as showing strong agglutination to anti-K serum but little or slight agglutination to anti-O serum, showing high virulence when injected into mouse brains, and showing significant necrotoxicity when intracutaneously injected into guinea-pigs.

The above mentioned killed vaccine is prepared by culturing a K antigen-possessing Phase I organism of *Bordetella bronchiseptica* in a base medium of nutrient agar or nutrient broth which has been incorporated with 0.5 to 1.0 percent of Casamino acid, 0.05 to 1.0 percent of yeast extract, and 0.1 to 0.5 percent of activated carbon powder or 0.3 to 1.0 percent of anion exchange resin, and then killing the resulting cells or inactivating a lysate of the cells.

2 Claims, No Drawings

KILLED VACCINE FOR INFECTIOUS PORCINE ATROPHIC RHINITIS AND PROCESS FOR PREPARING THE SAME

This invention relates to a killed vaccine excellent in immunogenicity which has been prepared by use of the microorganism *Bordetella bronchiseptica* with an aim to prevent swine from atrophic rhinitis, and to a process for preparing the said killed vaccine.

The atrophic rhinitis of swine is prevailing in various countries of the world and is causing such a serious economical damage to the hog raising industry as the inhibition in growth of swine and the reduction of feed efficiency. That a causal agent of the above-mentioned disease is chiefly *Bordetella bronchiseptica* has experimentally been confirmed by R. F. Gross et al. [Amer. Vet. Med. Assoc., Vol. 141, 1467 (1962)], J. R. Duncan et al. [Amer. Jour. Vet. Res., Vol. 27, 457 (1966)], R. F. Ross et al. [Vet. Med., Vol. 58, 566 (1963)], Shimizu et al. [Jap. J. Vet. Med., Vol. 32 Supplement, 30 (1970)], and the present inventors [Jap. J. Vet. Med., Vol. 33 Supplement (1971)].

For prevention of the above-mentioned disease, continuous administration of such chemicals as antibiotics, sulfonamide drugs, etc. was applied. Recently, however, the extermination of said disease became difficult due to the appearance of drug-resistant microorganisms. Moreover, there were such problems as the advent of super infection due to continuous administration of said chemicals, the limitation of antibiotic administration from the standpoint of public health, and the economy. In view of the above, processes for preventing said disease by use of chemicals are not always satisfactory, and it is the actual state that the establishment of a proper measure for prevention of the disease is demanded.

In 1969, J. R. Ganaway et al. announced that vaccination was effective for prevention of guinea-pig pneumonia derived from *Bordetella bronchiseptica* [*Lab. Anim. Care*, Vol. 15, 156 (1965)]. In view of this, D. L. Harris et al. prepared a formalin-inactivated vaccine of the said microorganism and attempted in vain to prevent swine from atrophic rhinitis by application of said vaccine, and they directed their efforts to the studies of attenuated live vaccine, judging that swine was different in immunity mechanism from guinea-pigs [Am. J. Vet. Res., Vol 30, 1161 (1969)].

However, the present inventors have succeeded in producing atrophic rhinitis in swine by inoculation with *Bordetella bronchiseptica* and confirmed that said microorganism is the pathogenic germ for the atrophic rhinitis of swine. The inventors have further found that a vaccine prepared from a K antigen-possessing germ contained in the microorganism *Bordetella bronchiseptica* has a marked protective potency, whereas a vaccine prepared from a K antigen-free germ contained in said microorganism displays no such potency.

The killed vaccine of the present invention is prepared by using as the starting material a Phase I organism contained in *Bordetella bronchiseptica* isolated from, for example, the respiratory tracts of swine or dogs which sufficiently possesses a K antigen and an antigen capable of giving to mice a protective potency against mouse intracerebral infection derived from said microorganism. The Phase I organism referred to herein is, as disclosed in the report of the present inventors [Kitasato Arch. Exp. Med., Vol. 30, 57 (1957)], a Gramnegative germ which exhibits on a blood agar medium a coccoid or coccobacillary form having capsules or envelopes and having no or slight flagella and which has such properties as showing strong agglutination to anti-K serum but little or slight agglutination to anti-O serum, showing high virulence when injected into mouse brains, and showing significant necrotoxicity when intracutaneously injected into guinea-pigs. (In the above, the anti-K serum is a rabbit serum prepared by adsorbing a Phase I organism-immunized rabbit serum with a Phase III organism or Phase I organism heated to 100° to 120°C.; the Phase III organism is a Phase I organism which has lost its capsules or envelopes; and the anti-O serum is a rabbit serum immunized with a Phase I organism or Phase III organism heated to 100° to 120°C.)

The killed vaccine of the present invention has excellent immunogenicity and safety, prevents swine from the disease by injection or inhalation, and can give excellent immunity to swine accurately and economically. The vaccine of the present invention has such properties that when it is intraperitoneally injected into mice and, 10 days thereafter, the microorganism *Bordetella bronchiseptica* is injected into the brains of the mice in a dose of 10 – 100 $LD_{50}$ ($LD_{50}$ means the amount of microorganism capable of killing 50 percent of the mice), the mice are prevented from infection, and that when it is injected into swine or rabbits, there are produced antibodies (K-antibodies) capable of strongly agglutinating the Phase I organism.

For preparation of the killed vaccine of the present invention, a blood agar medium is ordinarily used as the base medium. This is because that the presence or absence of K antigen in the microorganism *Bordetella bronchiseptica* is an important key to dominate the protective potency of the vaccine, as mentioned above, and the blood in the blood agar medium has an action of preventing the disappearance of the K antigen. However, it is difficult to secure a large amount of blood for production of the vaccine. Accordingly, the inventors examined K antigen-protecting materials usable in place of blood to confirm that a specific combination of Casamino acid, yeast extract, and activated carbon or ion exchange resin is more excellent than blood, and that a vaccine prepared from the microorganism cultured in a medium containing said combination is excellent in preventive effect. Thus, the inventors have made extremely easy the mass production of the present vaccine.

The combination usable in place of blood is composed of 0.5 to 1.0 percent by weight of Casamino acid, 0.05 to 0.1 percent by weight of yeast extract, and 0.1 to 0.5 percent by weight of activated carbon powder or 0.3 to 1.0 percent by weight of anion exchange resin, based on the weight of a solid or liquid base medium such as nutrient agar or broth medium ("Methods in Microbiology," pages 116 – 117, edited by J. R. Norris and D. W. Ribbons, Academic Press, 1970). This combination is incorporated, in place of blood, into said base medium of nutrient agar or broth.

That is, the killed vaccine according to the present invention is prepared in such a manner that a K antigen-possessing Phase I organism of *Bordetella bronchiseptica* is cultured in the above-mentioned charcoal broth medium or charcoal agar medium in order to sufficiently retain the active substance and to make the mass production possible, and the resulting cells are killed or a lysate of the cells is inactivated by heat treatment at 50° to 60°C., by use of such a chemical as Thimerosal (sodium ethylmercurithiosalicylate) or formalin, or by adoption of a physical procedure using a sonic disintegrator or French press. The thus prepared killed vaccine is used as it is or after addition of an alumina gel or oil adjuvant.

Procedures for preparing the killed vaccine of the present invention are illustrated below with reference to examples, but the scope of the invention is not limited to these examples. In the examples, all percentages are by weight.

EXAMPLE 1

A K antigen-possessing Phase I organism of Bordetella bronchiseptica is inoculated in a medium prepared by adding 0.5 to 1.0 percent of Casamino acid, 0.05 to 0.1 percent of yeast extract and 0.5 to 0.1 percent of activated carbon powder to nutrient agar as the base medium, a medium prepared by further adding 0.5 to 1.0 percent of polypeptone to the above-mentioned medium, or a medium identical in composition with the above-mentioned medium except that 0.3 to 1.0 percent of anion exchange resin is added in place of the activated carbon powder, and then cultured at 37°C. for 48 hours. The resulting cells are collected and then charged into a phosphate buffer solution to form a concentration of 1 to 200 billion/ml. of a cell suspension. Subsequently, the cells are killed by heating the suspension at 50° to 60°C. for 30 minutes, or by treating the suspension with 0.05 to 0.1 percent of formalin or with 0.01 to 0.02 percent of Thimerosal, and then the thus treated suspension is incorporated with 0.01 percent of Thimerosal as a preservative to prepare a vaccine.

EXAMPLE 2

A K antigen-possessing organism of Bordetalla bronchiseptica is inoculated in a medium prepared by adding 0.5 to 1.0 percent of Casamino acid, 0.05 to 0.1 percent of yeast extract and 0.1 to 0.5 percent of activated carbon powder to nutrient broth as the base medium, or a medium identical in composition with the above-mentioned medium except that 0.3 to 1.0 percent of anion exchange resin is added in place of the activated carbon powder, and then subjected to a settling culture or a shaking culture at 37°C. for 48 hours. After collecting the resulting cells by centrifugation, the same operation as in Example 1 is effected to prepare a vaccine.

EXAMPLE 3

To the vaccine of Example 1 is added an alumina gel so that the amount of aluminum ions becomes 2 to 10 mg/ml., whereby an adjuvant vaccine is obtained. A vaccine identical in effectiveness with the above-mentioned vaccine can also be obtained by adding the equal amount of an oil adjuvant for emulsifying in place of the alumina gel.

EXAMPLE 4

In the same manner as in Example 2, a culture liquor is prepared by inoculating and culturing a K antigen-possessing Phase I organism of Bordetella bronchiseptica in a liquid medium, and then killing the resulting cells by addition of 0.01 to 0.02 percent of Thimerosal. The culture liquor is incorporated with 2 to 10 mg/ml. of an alumina gel and allowed to stand overnight at 4°C., and then the supernatant is removed to prepare a vaccine in the form of a gel to which have been adsorbed the cells of the said organism and soluble effective substances.

EXAMPLE 5

The cells obtained in Example 1 or 2 are disrupted by subjecting the same to sonic treatment of 10 kc. or to French press, and then incorporated with 0.01 percent of Thimerosal to prepare a vaccine. This vaccine is suitable for immunity by inhalation.

The vaccine of the present invention is diluted to a concentration or an equivalent concentration of 1 to 200 billion/ml., and 1 to 5 ml. of the diluted vaccine is injected 2 to 3 times into, or inhaled through the nasal cavities of, 3 to 30 day-old piglets at intervals of 1 to 3 weeks, whereby active immunization can be imparted to the piglets. In addition, the diluted vaccine is injected 2 to 4 times into mother pigs at said intervals, and then booster injection is further effected during the pregnancy, whereby passive immunization can be imparted to delivered piglets due to maternal-fetal immunity. Further, adult pigs can be immunized by injecting 2 to 3 times 3 to 10 ml. of the above-mentioned diluted vaccine at intervals of 1 to 3 weeks.

Clinical effects of the killed vaccines according to the present invention are shown below with reference to examples, but the scope of the invention is not limited to the examples.

EXAMPLE 6

Each of the vaccines prepared in Examples 1 to 4 was diluted to a concentration of 30 billion/ml. Subsequently, 1 ml. of the diluted vaccine was intramuscularly injected into respective 100 piglets of 7 and 21 days old. Two weeks after the first injection, 2 ml. of said diluted vaccine was further injected intramuscularly into the piglets. After 6 months, clinical symptoms of the piglets were observed and compared with those of control piglets which had not been injected with the vaccine. That is, each piglet was anatomized after 6 months to investigate the turbinate atrophy thereof to obtain the results as set forth in Table 1. From Table 1, it is understood that the vaccine of the present inven- Table 1

| Group | Injection time | B. bronchiseptica recovery rate (%) | | | | Positive rate of turbinate atrophy (%) | | | |
|---|---|---|---|---|---|---|---|---|---|
| | | No. 1 | No. 2 | No. 3 | No. 4 | No. 1 | No. 2 | No. 3 | No. 4 |
| 7 Day-old group | 7th and 21st days after delivery | 29 | 18 | 23 | 17 | 0 | 0 | 0 | 0 |
| 21 Day-old group | 21st and 35th days after delivery | 29 | 20 | 21 | 20 | 7 | 8 | 9 | 4 |
| Control group | — | 87 | 78 | 84 | 69 | 46 | 52 | 63 | 47 |

Note: Numerals shown in the columns Nos. 1 to 4 are results obtained by use of the vaccines prepared in Examples 1 to 4, respectively.

tion is markedly effective, and that more excellent effects can be attained when the inoculation of vaccine is initiated at an early stage after delivery. (Even if the germ had been detected, the inoculated groups were slight in clinical symptoms, and the 7 day-old group could remain without producing the turbinate atrophy.)

EXAMPLE 7

The sonic-treated vaccine prepared in Example 5 was diluted to a concentration of 200 billion/ml. Subsequently, 5 ml. of the diluted vaccine was inhaled through the nasal cavity of each of 100 piglets of 8 days old. After 3 weeks, the alumina gel vaccine prepared in Example 3 which had been diluted to a concentration of 30 billion/ml. was intramuscularly injected into the piglets in a dose of 2 ml. (Group A). Piglets of other group (Group B) were individually injected intramuscularly 2 times at intervals of 3 weeks with 2 ml. of the alumina gel vaccine prepared in Example 3 which had been diluted to a concentration of 30 billion/ml. Thereafter, the clinical symptoms of the inoculated piglets were compared with those of control piglets which had not been inoculated with the vaccine. As the result, it was found, as shown in Table 2, that even when applied by inhalation, the vaccine according to the present invention successfully increases the agglutinin titer and is effective in view of the positive rate of turbinate atrophy. (Even if the germs had been detected, the inoculated groups were slight in clinical symptoms and were low in positive rate of turbinate atrophy, like in the case of Example 6.)

EXAMPLE 8

Each of the vaccines prepared in Examples 1 to 4 was diluted to a concentration of 30 billion/ml. Subsequently, 3 to 10 ml. of the diluted vaccine was intramuscularly injected 2 to 4 times into mother pigs at intervals of 2 to 4 weeks to immunize the mother pigs basically. During the pregnancy of the mother pigs, booster injection was further effected 2 to 3 times by injecting 3 to 10 ml. of the above-mentioned diluted vaccine each time. As the result, the delivered piglets had been highly immunized due to maternal-fetal immunity, and it was found, as shown in Table 3, that the vaccines according to the present invention are effective in view of the positive turbinate atrophy rate of piglets delivered from non-inoculated control mother pigs.

Table 2

| Group | Inoculation procedure | Agglutinin titer Before second inoculation | Agglutinin titer 4 Weeks after second inoculation | B. Bronchiseptica recovery rate of 3 to 6 month-old stage (%) | Positive rate of turbinate atrophy of 6 month-old stage (%) |
| --- | --- | --- | --- | --- | --- |
| A | Inhalation + Injection | 22.4 | 50.2 | 33 | 0 |
| B | Injection + Injection | 22.5 | 113.0 | 17 | 6.3 |
| Control | — | <5 | <5 | 80 | 76.2 |

Table 3

| Group | No. | Mother pig Injection dose (ml.) | Mother pig Injection times | Mother pig Agglutinin titer at 1 week before delivery | Delivered piglets Number | Delivered piglets Agglutinin titer at 1 week after delivery | Positive rate of turbinate atrophy at 1 month-old stage |
| --- | --- | --- | --- | --- | --- | --- | --- |
| A | 1 | 3 | 4 | 6400 | 8 | 800 – 3200 | 3/8 |
| A | 2 | 3 | 4 | 12800 | 9 | 800 – 6400 | 4/9 |
| A | 3 | 3 | 4 | 6400 | 10 | 800 – 6400 | 4/10 |
| A | 4 | 3 | 4 | 3200 | 8 | 800 – 1600 | 5/8 |
| B | 1 | 10 | 3 | 25600 | 9 | 6400 – 12800 | 2/9 |
| B | 2 | 10 | 3 | 12800 | 10 | 6400 – 12800 | 3/10 |
| B | 3 | 10 | 3 | 25600 | 11 | 12800–25600 | 2/11 |
| B | 4 | 10 | 3 | 12800 | 10 | 6400–12800 | 1/10 |
| Control | — | — | — | < 50 | 8 | < 5 | 8/8 |

Note: Numerals in the columns of No. correspond to the vaccines prepared in Examples 1 to 4, respectively.

We claim:

1. A killed vaccine for infectious porcine atrophic rhinitis incorporating an alumina gel or oil adjuvant which is prepared from a Phase I organism contained in the microorganism *Bordetella bronchiseptica* in a solid or liquid medium, and then killing the resulting cells or inactivating a lysate of the cells, said Phase I organism being a Gram-negative germ which possesses a K antigen and an antigen capable of giving to mice a protective potency against mouse intracerebral infection and exhibits on a blood agar medium a coccoid or coccobacillary form having capsules or envelopes and having no or slight flagella, and which has such properties as showing strong agglutination to anti-K serum but little or slight agglutination to anti-O serum, showing high virulence when injected into mouse brains, and showing significant necrotoxicity when intracutaneously injected into guinea-pigs.

2. In the art of immunizing delivered piglets, pregnant mother pigs and adult pigs, actively or passively, against infectious porcine atrophic rhinitis caused by *Bordetella bronchiseptica*, the improvement which consists of the step of immunizing said pigs with a killed vaccine prepared from a Phase I organism contained in the microorganism *Brodetella bronchiseptica*, said Phase I organism being a Gram-negative germ which possesses a K antigen and an antigen capable of giving to mice a protective potency against mouse intracerebral infection and exhibits on a blood agar medium a coccoid or coccobacillary form having capsules or envelopes and having no or slight flagella, and which has such properties as showing strong agglutination to anti-K serum but little or slight agglutination to anti-O serum, showing high virulence when injected into mouse brains, and showing significant necrotoxicity when intracutaneously injected into guinea-pigs.

* * * * *